US012670559B2

(12) United States Patent
Yahata

(10) Patent No.: US 12,670,559 B2
(45) Date of Patent: Jun. 30, 2026

(54) IMAGE SIGNAL PROCESSOR AND IMAGE SIGNAL PROCESSING METHOD

(71) Applicant: SK hynix Inc., Gyeonggi-do (KR)

(72) Inventor: Kazuhiro Yahata, Tokyo (JP)

(73) Assignee: SK hynix Inc., Gyeonggi-do (KR)

( * ) Notice: Subject to any disclaimer, the term of this patent is extended or adjusted under 35 U.S.C. 154(b) by 414 days.

(21) Appl. No.: 18/402,752

(22) Filed: Jan. 3, 2024

(65) Prior Publication Data

US 2025/0078212 A1 Mar. 6, 2025

(30) Foreign Application Priority Data

Sep. 5, 2023 (KR) ........................ 10-2023-0117866

(51) Int. Cl.
G06T 5/70 (2024.01)
G06T 3/4038 (2024.01)
G06V 10/54 (2022.01)

(52) U.S. Cl.
CPC .............. G06T 5/70 (2024.01); G06T 3/4038 (2013.01); G06V 10/54 (2022.01); G06T 2207/20182 (2013.01)

(58) Field of Classification Search
CPC ........................ G06T 5/70; G06T 2207/20182
See application file for complete search history.

(56) References Cited

U.S. PATENT DOCUMENTS

2006/0204126 A1* 9/2006 Kanda ...................... H04N 5/21
                                                348/E5.077
2014/0328538 A1* 11/2014 Kim ..................... H04N 25/133
                                                382/167
2015/0103212 A1* 4/2015 Saito ................... H04N 25/135
                                                348/242

FOREIGN PATENT DOCUMENTS

KR          10-1227530 B1      1/2013
KR          10-1703354 B1      2/2017
KR          10-1981573 B1      5/2019

* cited by examiner

*Primary Examiner* — Michael H Hong
(74) *Attorney, Agent, or Firm* — IP & T GROUP LLP

(57) ABSTRACT

An image signal processor capable of processing image signals and an image signal processing method for the same are disclosed. The image signal processor includes a remosaic processor configured to by perform remosaic processing on an input image to generate a converted image, a noise-amount estimator configured to estimate an amount of noise of the converted image based on preset noise-amount parameters and the input image, a noise-reduction-degree determiner configured to determine a degree of noise reduction and generate noise-reduction-degree information, and a noise suppression processor configured to generate an output image in which the degree of noise reduction is controlled based on the noise-reduction-degree information.

20 Claims, 4 Drawing Sheets

1

IMAGE SIGNAL PROCESSOR AND IMAGE SIGNAL PROCESSING METHOD

CROSS-REFERENCE TO RELATED APPLICATION

The present application claims the priority under 35 U.S.C. § 119 to, and benefits of, Korean patent application No. 10-2023-0117866, filed on Sep. 5, 2023, which is hereby incorporated by reference in its entirety and made a part thereof.

TECHNICAL FIELD

The technology and embodiments disclosed in the present disclosure generally relate to an image signal processor capable of processing image signals, and an image signal processing method for the same.

BACKGROUND

Recently, as the number of functions of electronic devices is rapidly increasing, demand for improving an image capture function using such electronic devices is also increasing. Accordingly, technology for improving a quality of images obtained by the electronic devices is required.

An image sensor used in an imaging device has a configuration in which color filters that respectively transmit red (R) light, green (G) light, and blue (B) light of a specific wavelength band for each pixel are attached to a surface of the sensor. Although there are various types of color arrays for color filters, Bayer arrays, each of which includes three types of filters that transmit only light of specific wavelengths of red, green, and blue, have been widely used.

Recently, as pixels of the image sensor are miniaturized in size, the amount of light incident upon each pixel is reduced, increasing a signal-to-noise ratio (SNR), and thus performance of the image sensor may rapidly deteriorate. In order to increase light transmittance of filters located inside the pixels and realize high-sensitivity pixels in a low-illumi-nance environment, utilization of the image sensor including white (W) filters as well as other filters that transmit only light of specific wavelengths such as red, green, and blue (RGB) is rapidly increasing.

SUMMARY

Various embodiments of the present disclosure relate to an image signal processor capable of reducing the degree of tone jump and/or the degree of discoloration in a process of generating a Bayer image having less noise from among images including white pixels.

In accordance with an embodiment of the present disclosure, an image signal processor may include a remosaic processor configured to perform remosaic processing on an input image to generate a converted image; a noise-amount estimator configured to estimate an amount of noise of the converted image based on preset noise-amount parameters and the input image; a noise-reduction-degree determiner configured to determine a degree of noise reduction and generate noise-reduction-degree information, based on the amount of noise estimated by the noise-amount estimator; and a noise suppression processor configured to generate an output image in which the degree of noise reduction is controlled based on the noise-reduction-degree information.

In accordance with another embodiment of the present disclosure, an image signal processing method may include performing remosaic processing on an input image including a Bayer image and a white image to generate a converted image; estimating a noise variance value of the converted image based on preset noise-amount parameters and pixel values of the input image; determining a degree of noise reduction based on the noise variance value; and suppressing the degree of noise reduction of the converted image based on the degree of noise reduction.

It is to be understood that both the foregoing general description and the following detailed description of the present disclosure are illustrative and descriptive and are intended to provide further description of the disclosure as claimed.

BRIEF DESCRIPTION OF THE DRAWINGS

The above and other features and beneficial aspects of the present disclosure will become readily apparent with reference to the following detailed description when considered in conjunction with the accompanying drawings.

DETAILED DESCRIPTION

Figure 1:
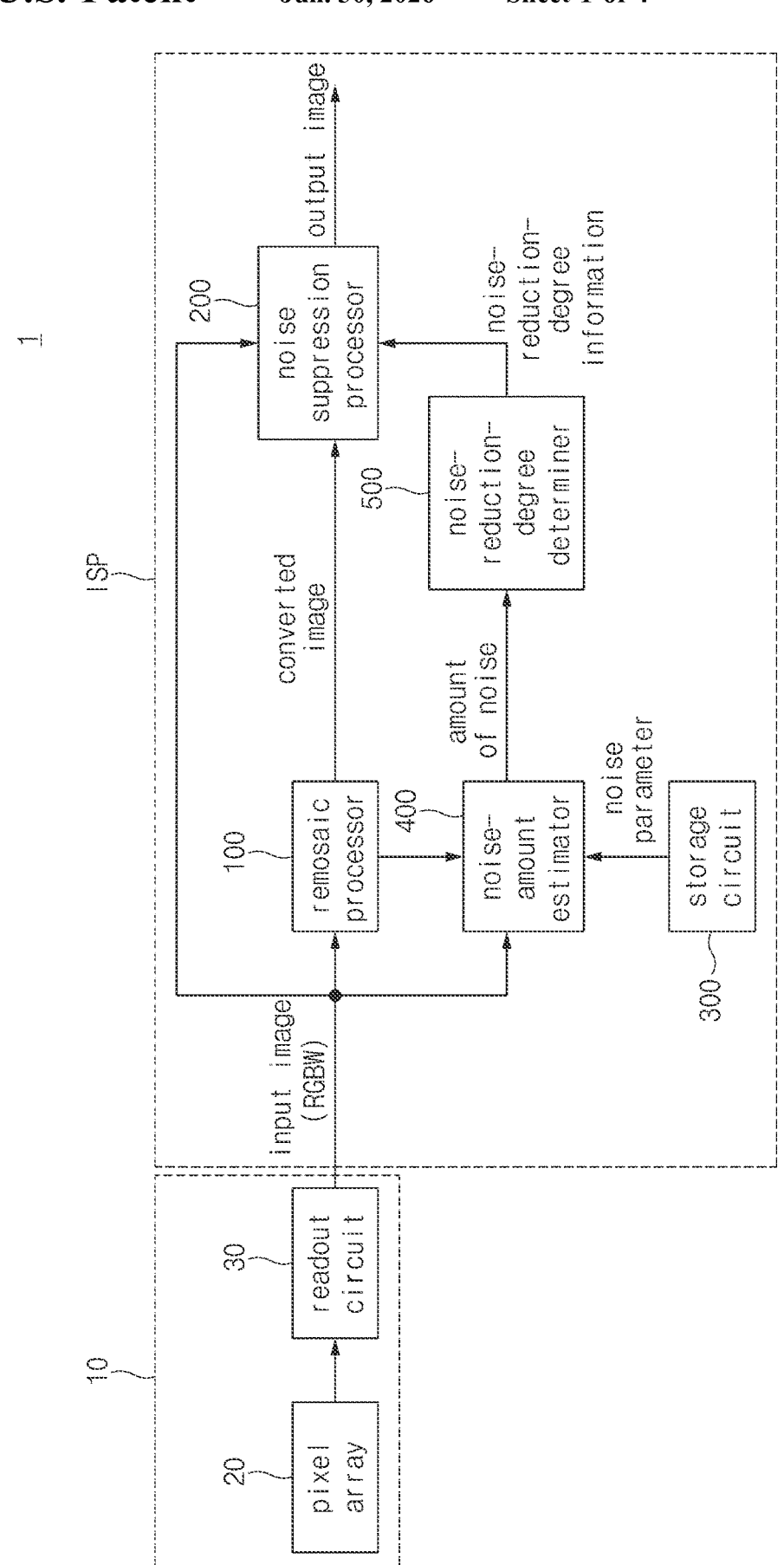
FIG. 1 is a block diagram illustrating an imaging device in accordance with an embodiment of the present disclosure.

The present disclosure provides embodiments and examples of an image signal processor and an image signal processing method for processing image signals that may be used in configurations to substantially address one or more technical or engineering issues and to mitigate limitations or disadvantages encountered in some image signal processors in the art. Some embodiments of the present disclosure relate to an image signal processor capable of reducing the degree of tone jump and/or the degree of discoloration in a process of generating a Bayer image having less noise from among images including white pixels. In recognition of the issues above, the image signal processor in accordance with embodiments of the present disclosure can reduce the degree of tone jump and/or the degree of discoloration during remosaic processing of RGBW patterns, thereby improving the quality of image signals.

Reference will now be made in detail to some embodiments of the present disclosure, examples of which are illustrated in the accompanying drawings. Wherever possible, the same reference numbers will be used throughout the drawings to refer to the same or like parts. While the disclosure is susceptible to various modifications and alternative forms, specific embodiments thereof are shown by way of example in the drawings. However, the disclosure should not be construed as being limited to the embodiments set forth herein.

Hereinafter, various embodiments will be described with reference to the accompanying drawings. However, it should be understood that the present disclosure is not limited to specific embodiments, but includes various modifications, equivalents and/or alternatives of the embodiments. The embodiments of the present disclosure may provide a variety of effects capable of being directly or indirectly recognized through the present disclosure.

FIG. 1 is a block diagram illustrating an imaging device 1 including a readout circuit 30 in accordance with an embodiment of the present disclosure.

Referring to FIG. 1, the imaging device 1 may include an image sensing device 10 and an image signal processor ISP.

Here, the image sensing device 10 may be or include a complementary metal oxide semiconductor image sensor (CIS) for converting an optical signal into an electrical signal. The image sensing device 10 may control overall operations, such as on/off control, operation mode control, operation timing control, sensitivity control, etc., by using a timing controller (not shown).

The image sensing device 10 may include a pixel array 20 and the readout circuit 30.

The pixel array 20 may include a plurality of pixels consecutively arranged in a two-dimensional (2D) matrix structure (e.g., continuously arranged in row and column directions). Each of the plurality of pixels of the pixel array 20 may generate a pixel signal obtained by converting an optical signal into an electrical signal and output the converted pixel signal to the readout circuit 30.

The readout circuit 30 may process an analog pixel signal output from each of the pixels and generate digital data corresponding to the pixel signal. For example, the readout circuit 30 may include an analog-to-digital converter (ADC) for performing ADC conversion of such pixel signal.

The image signal processor ISP may perform image processing on the image data received from the readout circuit 30. The image signal processor ISP may reduce noise of image data and may perform various types of image signal processing (e.g., gamma correction, color filter array interpolation, color matrix, color correction, color enhancement, lens distortion correction, etc.) for image-quality improvement of the image data. In addition, the image signal processor ISP may compress image data that has been created by execution of image signal processing for image-quality improvement, such that the image signal processor ISP can create an image file using the compressed image data. Alternatively, the image signal processor ISP may recover image data from the image file. In this case, the scheme for compressing such image data may be a reversible format or an irreversible format. As a representative example of such compression format, in the case of using a still image, Joint Photographic Experts Group (JPEG) format, JPEG 2000 format, or the like can be used. In addition, in the case of using moving images, a plurality of frames can be compressed according to Moving Picture Experts Group (MPEG) standards such that moving image files can be created. For example, the image files may be created according to Exchangeable image file format (Exif) standards.

Image transferred from the image sensing device 10 to the image signal processor ISP may be an RGBW pattern in which a Bayer image and a white image are mixed. The image signal processor ISP may perform signal processing to generate a Bayer image with less noise using a white image in an RGBW (Red, Green, Blue, White) pattern that includes a Bayer image and a white image.

The image signal processor ISP may include a remosaic processor 100, a noise suppression processor 200, a storage circuit 300, a noise-amount estimator 400, and a noise-reduction-degree determiner 500.

Here, the remosaic processor 100 may perform remosaic processing on the input image to generate a converted image having a Bayer pattern. In this case, the Bayer pattern may refer to a pattern in which green, red, and blue colors are alternately arranged at a specific ratio according to human visual characteristics. In addition, remosaic processing may refer to image processing that converts the original image into an image with a Bayer pattern.

The noise suppression processor 200 may perform noise suppression processing on the converted image based on noise-reduction-degree information received from the noise-reduction-degree determiner 500 and generate an output image. The noise suppression processor 200 may perform noise suppression processing by referring to the input image as a reference value when the degree of noise reduction is suppressed.

For example, when image capture (i.e., imaging) is performed with a high gain in a relatively dark low-illuminance environment, random noise may increase and a standard deviation of noise may further increase after remosaic processing of the capture image. Accordingly, the noise suppression processor 200 may increase the degree of noise reduction in situations where random noise must be reduced. On the other hand, if the amount of noise is excessively reduced and reaches a preset condition (for example, when the amount of noise is less than or equal to a rounding error), tone jump or discoloration may occur. Accordingly, the noise suppression processor 200 can suppress the degree of noise reduction in situations where noise must be maintained at a predetermined amount or greater.

The storage circuit 300 may store parameters required to estimate the amount of noise. For example, the storage circuit 300 may include registers, and determine the parameters required to estimate the amount of noise to be register values.

For example, the image signal processor ISP may investigate (or test, detect) the amount of noise after remosaic processing in advance and store the average amount of noise in the storage circuit 300. Here, the amount of noise to be generated after remosaic processing can be estimated from the number of pixels to be referred when the statistics value (r) required for remosaic processing is processed. In some other embodiments, software for performing an algorithm required for the remosaic processing such as floating point numbers is written in advance, so that various images are processed with the software. Finally, the relationship between a noise standard deviation of an input image for each gain setting and a noise standard deviation of a converted image for each gain setting can be investigated and calculated as needed.

The noise-amount estimator 400 may estimate the amount of noise of a converted image based on the input image, the converted image, and the noise-amount parameters received from the storage circuit 300. The noise-amount estimator 400 can estimate the amount of noise in various ways, and the method for estimating the amount of noise will be described in more detail with reference to FIG. 3 to be described later.

The noise-reduction-degree determiner 500 may determine the degree of noise reduction, and may generate information about the determined degree of noise reduction (hereinafter referred to as "noise-reduction-degree information"), based on the amount of noise estimated by the noise-amount estimator 400. A method for calculating the degree of noise reduction by the noise-reduction-degree determiner 500 will be described in more detail with reference to FIG. 3 to be described later.

Figure 2:
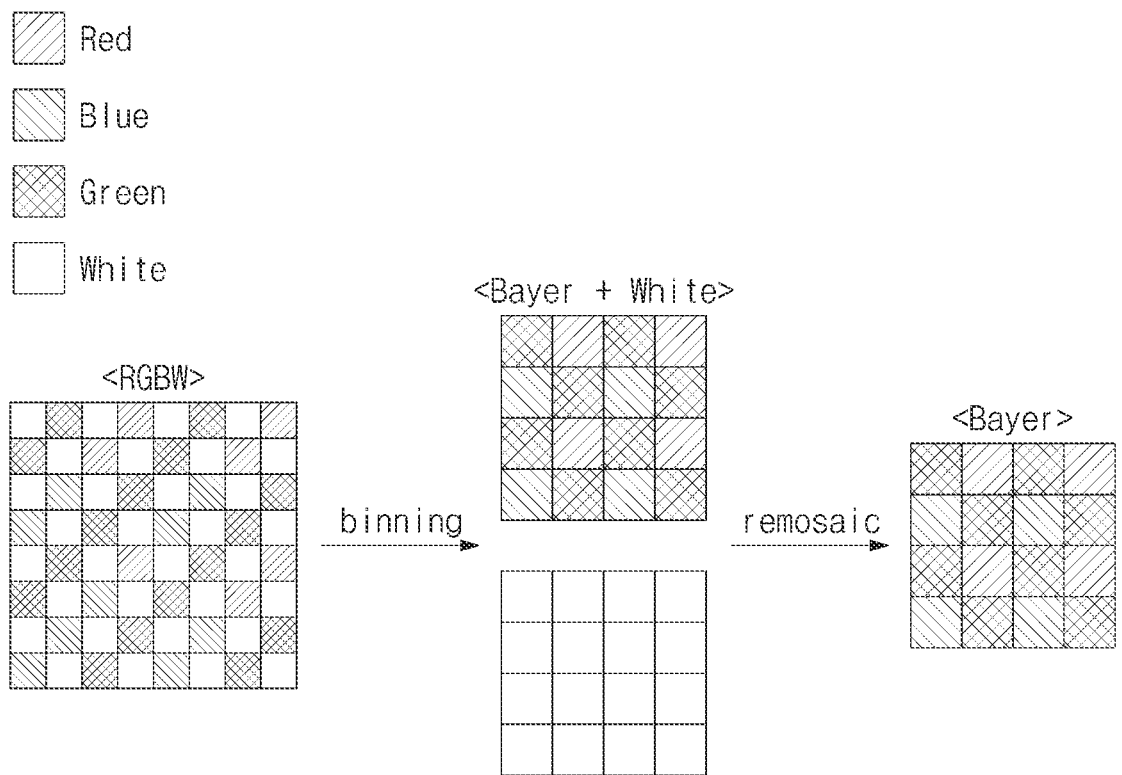
FIG. 2 is a schematic diagram illustrating an operation of a remosaic processor shown in FIG. 1 in accordance with an embodiment of the present disclosure.

FIG. 2 is a schematic diagram illustrating an operation of the remosaic processor 100 shown in FIG. 1 in accordance with an embodiment of the present disclosure.

Referring to FIG. 2, the input image to be applied to the remosaic processor 100 may be an RGBW pattern in which a Bayer image and a white image are mixed. The RGBW pattern may include color pixels of red (R), blue (B), and green (G) pixels, and white pixels.

Each of the color pixels (R, G, and B pixels) may be a pixel upon which light of a specific wavelength is incident by a corresponding color filter. In addition, the white pixel (W) may be a pixel having no color filters, and may be referred to as a texture pixel, a black-and-white pixel, or a monopixel. For example, the color pixels (R, G, B) may obtain color pixel values according to incident light of a specific color (e.g., red, green, blue, etc.) by a color filter that transmits only incident light of a specific wavelength. In contrast, the white pixel (W) may obtain a white pixel value according to incident light (e.g., visible light) that is not limited to a specific color.

In the embodiment of FIG. 2, although the RGBW pattern having the size of 64 pixels arranged in an (8×8) matrix has been described as an example for convenience of description, the size of the RGBW pattern and the arrangement shape of the respective pixels are not limited thereto.

As the pixels of the image sensing device 10 are miniaturized, the amount of incident light for each pixel is reduced, resulting in a reduced signal-to-noise ratio (SNR), which will cause performance of the image sensing device 10 to rapidly deteriorate. In order to increase light transmittance of each filter and realize high-sensitivity pixels in response to the low-illuminance environment, the utilization of the image sensing device 10 including white pixels as well as color filters (e.g., RGB filters) designed to transmit only light having a specific wavelength such as red, green, and blue (RGB) is rapidly increasing.

The white image may have relatively strong signal-to-noise ratio (SNR) characteristics compared to RGB images. Since the white image is designed to receive light of a full band as compared to RGB images receiving light of a specific band, the white image may have a relatively low SNR even when acquired in the low-illuminance environment.

The remosaic processor 100 may separate the Bayer image and the white image from each other by binning the RGBW pattern. Here, "binning" may mean summation of pixel values of the unit pixels having the same color on a sub-pixel array (SP) basis. For example, the remosaic processor 100 may sum (e.g., 4-summation) the pixel values of the unit pixels having the same color in the RGBW pattern in units of four (2×2) sub-pixels (i.e., on a sub-pixel basis), resulting in formation of the Bayer image and the white image.

The image signal processor ISP may output an image having good SNR (i.e., the Bayer image) by performing remosaic processing using the white image. In particular, when a high gain is applied to the image under the low-illuminance environment, the resultant image with superior SNR can be output.

The RGBW pattern may be a single-plate image sensor in which R, G, B, and W filters are arranged in a mosaic shape. Therefore, when generating the color image, it is necessary to perform remosaic processing as color coding to generate RGB pixel values corresponding to each pixel. Here, "remosaic processing" may be a task of outputting a high-quality image signal using pixel signals.

The remosaic processor 100 may perform remosaic processing on the original image using a remosaic method, resulting in formation of a converted image. In some embodiments, the remosaic method may be implemented as a method of performing remosaic processing based on a preset reference equation. The reference equation may be an equation for calculating the pixel value of each pixel included in the image on which remosaic processing has been performed. For example, the reference equation may be an equation that calculates pixel values of the remosaic-processed image obtained when weights are applied to pixel values of adjacent pixels in the original image.

In some embodiments, the remosaic processor 100 may be implemented as a software block to be executed by a predetermined processor or may be implemented as a combination of a dedicated hardware block and a processing unit.

Figure 3:
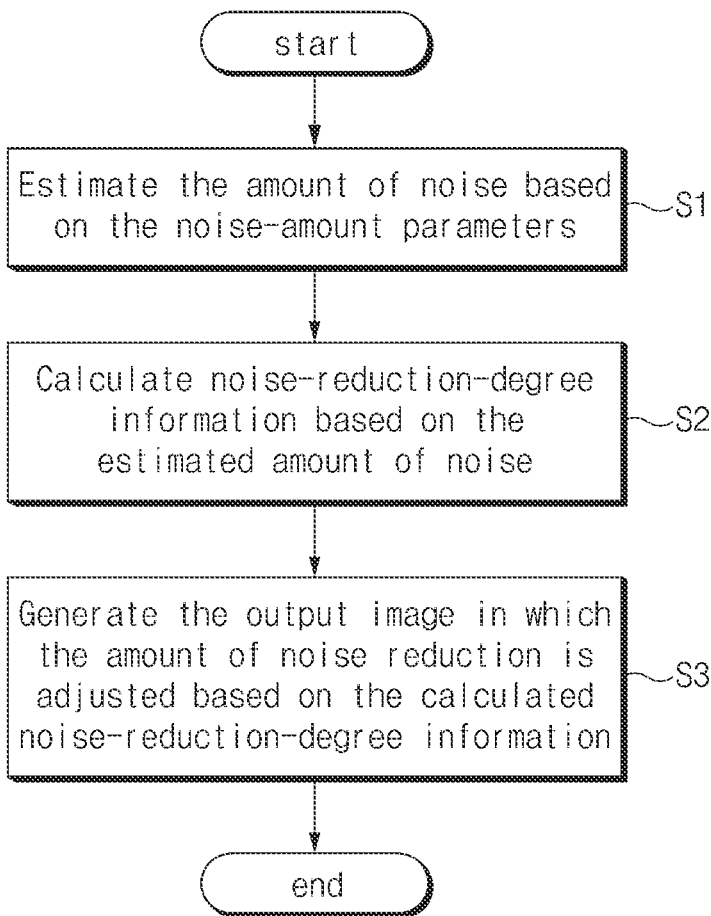
FIG. 3 is a flowchart illustrating an image signal processing method in accordance with an embodiment of the present disclosure.

FIG. 3 is a flowchart illustrating an image signal processing method in accordance with an embodiment of the present disclosure.

Referring to FIG. 3, the image signal processor ISP may set parameters for calculating the amount of noise to adjust the degree of noise reduction of the output image and store the set parameters in the storage circuit 300. That is, the storage circuit 300 may set various types of information related to noise to be reflected in noise reduction processing of the remosaic processor 100 as parameters, and may store the set information.

For example, the storage circuit 300 may store not only pixel values for each of red, green, and blue pixels of the input image, but also pixel values generated when light is blocked. In another example, the storage circuit 300 may store the amount of average noise reduction of the remosaic processor 100. As another example, the storage circuit 300 may store an average noise variance value of the input image and the converted image. In another example, the storage circuit 300 may store parameters related to the amount of shot noise and a noise variance value generated when light is blocked.

In still another example, the storage circuit 300 may store a gain value of pixel data for the input image. The image signal processor ISP may perform a digital operation to calculate a gain of pixel data during the remosaic operation. For example, the image signal processor ISP may perform various types of operations by adding the gain to pixel data during image signal processing (e.g., noise reduction, white balance adjustment, demosaicing, color correction, gamma correction, color change, etc.)

The amount of noise generated after remosaic processing may change depending on the amount of noise in the input image. The amount of noise in the input image may mainly depend on the gain (sensitivity) setting of the image sensing device 10. Accordingly, the image signal processor ISP may designate the parameters related to the amount of noise based on the gain value and may store the designated parameters in the storage circuit 300. Here, the relationship between the gain value and the amount of noise may be obtained by performing pixel data processing in advance and converting the processed result into data.

For example, the image signal processor ISP may preset the above parameters related to the amount of noise, may implement the parameters in software, and may store the software in the storage circuit 300. The image signal processor ISP may store the parameters as register values in the storage circuit 300 when the software is executed in the image signal processor ISP (or a CPU (Central Processing Unit) located inside or outside the ISP).

Thereafter, the noise-amount estimator 400 may estimate the amount of noise of the converted image based on the noise-amount parameters received from the storage circuit 300 (Operation S1). Hereinafter, specific embodiments capable of estimating the amount of noise by the noise-amount estimator 400 will be described in detail.

For example, the noise-amount estimator 400 may estimate a noise variance value of the converted image after the remosaic processor 100 performs noise processing based on the pixel value of the input image. The noise-amount estimator 400 may estimate the noise variance value (V) of the converted image as represented by the following equation 1.

$$V = R\{k(I - I0) + V0\} \qquad \text{[Equation 1]}$$

In Equation 1, R may represent a ratio ($V_{out}/V_{in}$) (hereinafter referred to as a variance ratio) of a noise variance value ($V_{out}$) of the converted image to a noise variance value ($V_{in}$) of the input image. Here, the variance ratio R may represent the amount of average noise reduction to be reflected in noise reduction processing of the remosaic processor 100. An average value of the variance ratio R may be pre-stored in the storage circuit 300. Additionally, the average value of the variance ratio R may be set to a different value depending on sensitivity at the time of image capture (shooting) and may be a function depending on the pixel value (I) of the input image.

In Equation 1 above, 'I' may represent a value of each red (R) pixel, a value of each green (G) pixel, and a value of each blue (B) pixel of the input image, and 'I0' may represent a pixel value obtained when light is blocked.

Additionally, in Equation 1 above, 'k' may be a parameter related to the amount of shot noise, and 'k' may be proportional to the gain. Furthermore, V0 may represent the noise variance value of the image sensing device 10 when light is blocked. 'k' may be a parameter based on the gain value. As the gain at the time of image capture (shooting) increases, an estimated value of the noise variance value (V) may also increase.

That is, as can be seen from Equation 1 above, the noise-amount estimator 400 may obtain a first value by subtracting the pixel value (I0) of the input image obtained by light blocking from the pixel value (I) of the input image, may obtain a second value by multiplying the first value by the parameter (k) related to the amount of shot noise, may obtain a third value by adding the noise variance value (V0) obtained by light blocking to the second value, and may multiply the third value by an average value of the variance ratio R, thereby estimating the noise variance value (V) of the converted image.

As another example, the noise-amount estimator 400 may estimate the amount of noise by distinguishing each region of the input image. In a target kernel, the input image may be divided into a flat region (i.e., a first region) and a texture region (i.e., a second region). Here, the flat region may mean a region in which a difference in pixel value between pixels included in the target kernel is not large (e.g., a difference in pixel value between the pixels is less than a first value). The texture region may refer to a region containing a texture. Image data corresponding to one frame may include textures of various sizes and shapes. Texture may refer to a set (aggregate) of pixels having similarity. For example, a subject with a unified color included in a scene can be recognized as a texture. A boundary of the texture may be defined as an edge, and pixel data may vary significantly inside (inside the texture) and outside (outside the texture) the edge. That is, the texture region may refer to a region in which a difference in pixel value between pixels included in the target kernel is large (e.g., a difference in pixel value between the pixels is greater than or equal to the first value).

Since the flat region does not include the edge region, it may be relatively easier to reduce noise compared to the texture region. On the other hand, since the texture region includes the edge region, it may be relatively difficult to reduce noise compared to the flat region. As a result, although the input image of the remosaic processor 100 has the same pixel value (I), the amount of noise of the converted image may vary depending on whether the corresponding image belongs to a flat region or a texture region within the input image.

As already described in Equation 1 above, the value of the variance ratio R may be stored in the storage circuit 300. The storage circuit 300 may discriminate between the average value (hereinafter referred to as R1) of the variance ratio R in the flat region and the average value (hereinafter referred to as R2) of the variance ratio R in the texture region and may store the resultant average values.

The noise-amount estimator 400 may determine each region of the input image. When the corresponding region includes a flat region, the noise-amount estimator 400 may select the variance ratio R1 as the R value and estimate the noise variance value (V) as represented by Equation 1. Then, the noise-amount estimator 400 may determine each region of the input image. When the corresponding region includes a texture region, the noise-amount estimator 400 may select the variance ratio R2 as the R value and estimate the noise variance value (V) as represented by Equation 1.

As another example, the noise-amount estimator 400 may estimate the amount of noise by measuring the degree of noise reduction. That is, the noise-amount estimator 400 may estimate the amount of noise based on the amount of noise calculated during noise reduction processing of the remosaic processor 100. For example, the noise-amount estimator 400 may estimate the noise variance value (V) of the converted image as represented by the following equation 2.

$$V = \{k(I - I0) + V0\}/N \qquad \text{[Equation 2]}$$

In Equation 2, 'I' may represent a value of each red (R) pixel, a value of each green (G) pixel, and a value of each blue (B) pixel of the input image. 'I0' may represent the pixel value obtained when light is blocked, and 'N' may represent the number of adjacent pixels used in variance calculation. Additionally, in Equation 2 above, 'k' may be a parameter related to the amount of shot noise, and 'V0' may represent the noise variance value of the image sensing device 10 when light is blocked.

That is, as can be seen from Equation 2 above, the noise-amount estimator 400 may obtain a fourth value by subtracting the pixel value (I0) of the input image obtained by light blocking from the pixel value (I) of the input image, may obtain a fifth value by multiplying the fourth value by the parameter (k) related to the amount of shot noise, may obtain a sixth value by adding the noise variance value (V0) obtained by light blocking to the fifth value, and may divide the sixth value by the number (N) of adjacent pixels, thereby estimating the noise variance value (V) of the converted image.

During noise reduction processing, the remosaic processor 100 may determine a pixel value of a target pixel using pixel values of neighboring pixels adjacent to the target pixel. The remosaic processor 100 may select N adjacent pixels, where N is an integer of 2 or greater, located around the target pixel, and may determine a value of the target pixel by calculating a statistics value (e.g., an average pixel value, etc.) of the adjacent pixels. Here, as the value of N increases, the value of the noise variance value generated after remosaic processing may decrease. For example, when the average of pixel values of N adjacent pixels is calculated, the noise variance value (V) may be denoted by 1/N. Therefore, the noise-amount estimator 400 may estimate the noise variance value (V) using the number (N) of adjacent pixels, as represented by Equation 2.

The image signal processor ISP may convert the RGBW pattern into a Bayer pattern (i.e., a converted image) by performing various types of signal processing on the RGBW pattern during the remosaic processing. For example, during the remosaic processing, the remosaic processor 100 may perform a digital calculation operation of multiplying pixel data by a gain. Here, quantization errors may be accumulated, which may cause a difference in color sense between images. Accordingly, to reduce noise and rapidly perform arithmetic calculation when remosaicing the RGBW pattern, the image signal processor ISP may round off a decimal part from among bits of the pixel data value without expressing the decimal part, or may limit the decimal part to a preset limited number of digits.

However, when image capture (shooting) is performed with a low gain under the relatively bright high-illuminance environment, the standard deviation of random noise becomes smaller than a specific value, such that the effect of rounding error may be greater than the effect of random noise. For example, if the amount of random noise becomes smaller than the value of "1" after remosaic processing, the effect of rounding errors may increase and false colors may occur. Accordingly, when the amount of noise is excessively reduced during the remosaic processing, tone jump or discoloration, etc. may occur in the output image.

Accordingly, the noise-reduction-degree determiner 500 may calculate noise-reduction-degree information based on the amount of noise estimated by the noise-amount estimator 400 (Operation S2). For example, when the noise variance value (V) estimated by the noise-amount estimator 400 becomes smaller than the value of '1', the noise-reduction-degree determiner 500 may realize that tone jump or discoloration occurs in the output image.

Although the embodiments of the present disclosure have disclosed that false colors occur in the output image when the noise variance value is less than "1" for convenience of description, the scope or spirit of the present disclosure is not limited thereto, and it should be noted that a reference value (criterion) of the noise variance value may also be set to another value as needed.

$$L = a(I - J) + J \qquad \text{[Equation 3]}$$

In Equation 3, 'I' may represent a pixel value of the input image before noise reduction, 'J' may represent a pixel value of the converted image after noise reduction, and 'a' may represent a noise suppression parameter. For example, when a is set to zero '0' (i.e., a first parameter value), there is no suppression effect of noise reduction (hereinafter referred to as 'first reduction degree'), and when a is set to '1' (i.e., a second parameter value), the input pixel value (I) may be output, such that the suppression effect of noise reduction can be maximized (hereinafter referred to as 'second reduction degree'). When a noise suppression parameter is set to a, the noise-reduction-degree determiner 500 may calculate a pixel value (L) obtained when the degree of noise reduction is determined by Equation 3 above. Namely, the L value may represent noise-reduction-degree information obtained by suppressing the noise reduction effect.

That is, as can be seen from Equation 3 above, the noise-reduction-degree determiner 500 may obtain a seventh value by subtracting the pixel value (J) of the converted image from the pixel value (I) of the input image, may obtain an eighth value by multiplying the seventh value by the noise suppression parameter (a), and may add the pixel value (J) of the converted image to the eighth value, so that the noise-reduction-degree determiner 500 may determine the pixel value (L) obtained when the degree of noise reduction is determined.

Subsequently, the noise suppression processor 200 may control the reduction degree of the amount of noise for the converted image based on the noise-reduction-degree information (Operation S3). That is, the noise suppression processor 200 may suppress the degree of noise reduction to prevent the noise variance value of the output image from being equal to or less than '1'.

$$Ve \sim a^2 V_{in} + V_{out}(1 - a^2) \sim V_{in}\{a^2 + R(1 - a^2)\} \qquad \text{[Equation 4]}$$

The noise variance value (Ve) of the output image being finally output from the noise suppression processor 200 may be obtained as represented by Equation 4 above. Accordingly, the noise-reduction-degree determiner 500 may determine the noise suppression parameter (a) so that the noise variance value (Ve) of the output image being output from the noise suppression processor 200 becomes "1" (or another integer value) or greater. The noise suppression parameter (a) determined by the noise-reduction-degree determiner 500 may be set as '0≤a≤1'.

Accordingly, the output image being output from the noise suppression processor 200 after remosaic processing may be an output image obtained when the degree of noise reduction is suppressed. Accordingly, the embodiments of the present disclosure may estimate the amount of noise of the converted image, may adjust the degree of noise reduction based on the estimated amount of noise, and may thus prevent tone jump, discoloration, etc. from occurring in the output image.

Figure 4:
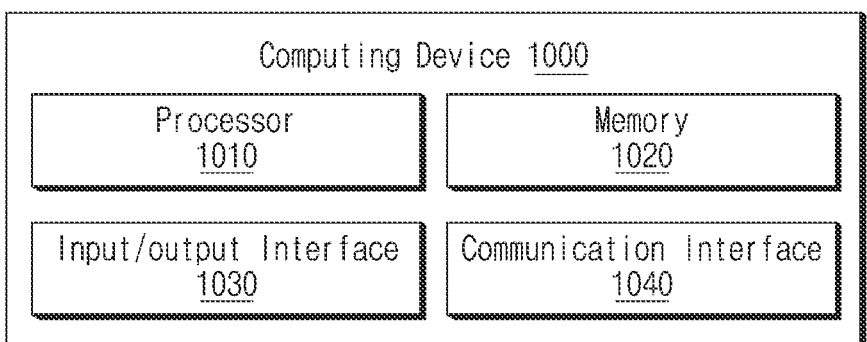
FIG. 4 is a block diagram illustrating a computing device corresponding to the imaging device shown in FIG. 1 in accordance with an embodiment of the present disclosure.

FIG. 4 is a block diagram showing a computing device 1000 corresponding to the imaging device 1 shown in FIG. 1 in accordance with an embodiment of the present disclosure.

Referring to FIG. 4, the computing device 1000 may represent an embodiment of a hardware configuration for performing the operation of the imaging device 1 of FIG. 1.

The computing device 1000 may be mounted on a chip that is independent from the chip on which the image sensing device is mounted. According to one embodiment, the chip on which the image sensing device 10 is mounted and the chip on which the computing device 1000 is mounted may be implemented in one package, for example, a multi-chip package (MCP), but the scope of the present disclosure is limited thereto.

Additionally, the internal configuration or arrangement of the computing device 1000, the image sensing device 10 and the image signal processor ISP described in FIG. 1 may vary depending on the embodiment. For example, at least a portion of the computing device 1000 may be included in the image sensing device 10. Alternatively, at least a portion of the computing device 1000 may be included in the image sensing device 10. In this case, at least a portion of the computing device 1000 may be mounted together on a chip on which the image sensing device 10 is mounted.

The computing device 1000 may include a processor 1010, a memory 1020, an input/output interface 1030, and a communication interface 1040.

The processor 1010 may process data and/or instructions required to perform the operations of the components (100, 200, 300, 400, 500) of the image signal processor ISP described in FIG. 1. That is, the processor 1010 may refer to the image signal processor ISP, but the scope of the present disclosure is not limited thereto.

The memory 1020 may store data and/or instructions required to perform operations of the components (100, 200, 300, 400, 500) of the image signal processor ISP, and may be accessed by the processor 1010. For example, the memory 1020 may be a volatile memory such as Dynamic Random Access Memory (DRAM), Static Random Access Memory (SRAM), or the like. Further, the memory 1020 may be a non-volatile memory such as Programmable Read Only Memory (PROM), Erasable PROM (EPROM), etc.), EEPROM (Electrically Erasable PROM), flash memory, or the like.

That is, the computer program for performing the operations of the image signal processor ISP disclosed in this document is recorded in the memory 1020 and executed and processed by the processor 1010, thereby implementing the operations of the image signal processor ISP.

The input/output interface 1030 is an interface that connects an external input device (e.g., keyboard, mouse, touch panel, etc.) and/or an external output device (e.g., display) to the processor 1010 to allow data to be transmitted and received.

The communication interface 1040 is a component that can transmit and receive various data with an external device (e.g., an application processor, an external memory, etc.), and may be a device that supports wired or wireless communication.

As is apparent from the above descriptions, the image signal processor and the image signal processing method in accordance with embodiments of the present disclosure can reduce the degree of tone jump and/or the degree of discoloration during remosaic processing of RGBW patterns, thereby improving the quality of image signals.

The embodiments of the present disclosure may provide a variety of effects capable of being directly or indirectly recognized through the above-mentioned embodiments of the present disclosure.

Although a number of illustrative embodiments have been described, it should be understood that modifications and enhancements to the disclosed embodiments and other embodiments can be devised based on what is described and/or illustrated in the disclosure and the following claims. Furthermore, the embodiments may be combined to form additional embodiments.

What is claimed is:

1. An image signal processor comprising:
   a remosaic processor configured to perform remosaic processing on an input image to generate a converted image;
   a noise-amount estimator configured to estimate an amount of noise of the converted image based on preset noise-amount parameters and the input image;
   a noise-reduction-degree determiner configured to determine a degree of noise reduction and generate noise-reduction-degree information, based on the amount of noise estimated by the noise-amount estimator; and
   a noise suppression processor configured to generate an output image in which the degree of noise reduction is controlled based on the noise-reduction-degree information.

2. The image signal processor according to claim 1, wherein the input image includes a Bayer image and a white image.

3. The image signal processor according to claim 1, wherein the converted image includes a Bayer image.

4. The image signal processor according to claim 1, wherein the remosaic processing is performed by:
   binning the input image to generate a Bayer image and a white image; and
   performing noise reduction processing on the Bayer image based on the white image.

5. The image signal processor according to claim 1, further comprising a storage circuit configured to store the noise-amount parameters.

6. The image signal processor according to claim 1, wherein the noise suppression processor is configured to perform processing to suppress the degree of noise reduction using the input image as a reference value based on the noise-reduction-degree information.

7. The image signal processor according to claim 1, wherein the noise-amount estimator is configured to estimate a noise variance value of the converted image based on pixel values of the input image.

8. The image signal processor according to claim 1, wherein the noise-amount estimator is configured to estimate the amount of noise as different values in a first region and a second region of the input image.

9. The image signal processor according to claim 1, wherein the noise-amount estimator is configured to estimate the amount of noise based on the amount of noise calculated during noise reduction processing performed by the remosaic processor.

10. The image signal processor according to claim 6, wherein the noise suppression processor is configured to suppress the degree of noise reduction when a noise variance value of the output image is less than or equal to a preset rounding error.

11. The image signal processor according to claim 7, wherein the noise-amount parameters are determined based on an average value of a variance ratio of the noise variance value of the converted image to a noise variance value of the input image.

12. The image signal processor according to claim 11, wherein the noise-amount estimator is configured to estimate the noise variance value of the converted image based on the variance ratio, a pixel value of the input image obtained when light is blocked, a noise variance value obtained when light is blocked, and parameters related to an amount of shot noise.

13. The image signal processor according to claim 8, wherein:
   the first region includes a flat region in which a difference in pixel value between pixels included in a target kernel is less than a preset first value; and
   the second region includes a texture region in which a difference in pixel value between pixels included in the target kernel is equal to or greater than the first value.

14. The image signal processor according to claim 8, wherein:

in the first region, a ratio between a noise variance value of the converted image and a noise variance value of the input image is set to a first variance ratio; and in the second region, a ratio between a noise variance value of the converted image and a noise variance value of the input image is set to a second variance ratio different from the first variance ratio.

15. The image signal processor according to claim 14, wherein the noise-amount estimator is configured to:

determine the first and second regions of the input image;

estimate the noise variance value of the converted image by applying the first variance ratio to the first region; and estimate the noise variance value of the converted image by applying the second variance ratio to the second region.

16. The image signal processor according to claim 9, wherein the noise-amount estimator is configured to estimate a noise variance value of the converted image based on a pixel value of the input image, a pixel value of the input image obtained when light is blocked, a noise variance value obtained when light is blocked, parameters related to an amount of shot noise, and an average pixel value of adjacent pixels located around a target pixel.

17. The image signal processor according to claim 9, wherein the noise-reduction-degree determiner is configured to:

output the noise-reduction-degree information indicating a first reduction degree when a noise suppression parameter is a first parameter value; and output the noise-reduction-degree information indicating a second reduction degree when the noise suppression parameter is a second parameter value greater than the first parameter value.

18. An image signal processing method comprising:

performing remosaic processing on an input image including a Bayer image and a white image to generate a converted image;

estimating a noise variance value of the converted image based on preset noise-amount parameters and pixel values of the input image;

determining a degree of noise reduction based on the noise variance value; and suppressing the degree of noise reduction of the converted image based on the degree of noise reduction.

19. The image signal processing method according to claim 18, wherein the estimating the noise variance value includes:

calculating an average value for a variance ratio of the noise variance value of the converted image to a noise variance value of the input image;

calculating a first value by subtracting a pixel value of the input image obtained when light is blocked from the pixel value of the input image;

calculating a second value by multiplying the first value by a parameter related to an amount of shot noise;

calculating a third value by adding a noise variance value obtained when light is blocked to the second value; and multiplying the third value by the average value for the variance ratio.

20. The image signal processing method according to claim 18, wherein the determining the degree of noise reduction includes:

calculating a noise suppression parameter corresponding to the noise variance value of the converted image; and suppressing the degree of noise reduction based on the noise suppression parameter so that the noise variance value of the converted image is equal to or greater than a preset first value; and generating an output image with the suppressed degree of noise reduction.

* * * * *